United States Patent
Momin

(10) Patent No.: US 9,293,961 B2
(45) Date of Patent: Mar. 22, 2016

(54) SYSTEMS AND METHODS FOR A MOTOR WITH A VERTICAL OIL MIST CONFIGURATION

(75) Inventor: Noamanali N. Momin, Sugar Land, TX (US)

(73) Assignee: Toshiba International Corporation, Houston, TX (US)

( * ) Notice: Subject to any disclaimer, the term of this patent is extended or adjusted under 35 U.S.C. 154(b) by 91 days.

(21) Appl. No.: 13/411,027

(22) Filed: Mar. 2, 2012

(65) Prior Publication Data
US 2013/0229073 A1 Sep. 5, 2013

(51) Int. Cl.
*H02K 5/10* (2006.01)
*H02K 5/124* (2006.01)
*H02K 5/167* (2006.01)
*H02K 5/173* (2006.01)
*F16C 33/66* (2006.01)

(52) U.S. Cl.
CPC .............. *H02K 5/10* (2013.01); *F16C 33/6662* (2013.01); *F16C 33/6685* (2013.01); *H02K 5/124* (2013.01); *H02K 5/1732* (2013.01)

(58) Field of Classification Search
CPC ............................ H02K 5/1672; F16C 33/107
USPC .......................................................... 310/90
See application file for complete search history.

(56) References Cited

U.S. PATENT DOCUMENTS

| | | | | |
|---|---|---|---|---|
| 4,844,625 A | * | 7/1989 | Katsuzawa et al. | 384/473 |
| 5,509,381 A | * | 4/1996 | Fisher | 123/41.31 |
| 5,704,719 A | * | 1/1998 | Cook et al. | 384/484 |
| 2006/0066162 A1* | | 3/2006 | Woodson | 310/71 |
| 2007/0210661 A1* | | 9/2007 | Schmidt et al. | 310/90 |
| 2008/0166076 A1* | | 7/2008 | Stout et al. | 384/99 |
| 2009/0322170 A1* | | 12/2009 | Sone et al. | 310/90 |
| 2010/0048803 A1* | | 2/2010 | Tsuneyoshi et al. | 524/555 |
| 2010/0135606 A1* | | 6/2010 | Ehlert et al. | 384/477 |

* cited by examiner

*Primary Examiner* — Terrance Kenerly
(74) *Attorney, Agent, or Firm* — Baker Botts L.L.P.

(57) ABSTRACT

The present disclosure describes an electric motor that includes a case and a shaft at least partially disposed within the case. A bearing mechanism may also be disposed within the case, and the bearing mechanism may have a first side and a second side opposite the first side. An oil mist inlet may be positioned adjacent to a first side of the bearing mechanism and be in fluid communication with the bearing mechanism. An oil mist outlet may be positioned adjacent to the second side of the bearing mechanism and be in fluid communication with the bearing mechanism.

13 Claims, 4 Drawing Sheets

SYSTEMS AND METHODS FOR A MOTOR WITH A VERTICAL OIL MIST CONFIGURATION

FIELD

Embodiments described herein related generally to electric motors and methods of manufacturing the same.

BACKGROUND

Electric motors are currently used in a wide range of applications and conditions and typically require periodic maintenance as a part of ordinary use. This periodic maintenance includes lubricating motor components. For example, electric motors typically includes at least one set of bearings that allow a shaft/rotor to spin within an electric coil. Currently, the bearings are packed with grease to reduce friction and allow the bearings to rotate freely. Unfortunately, the grease must be changed periodically, and changing the grease requires an on-site technician, which is problematic in remote locations. Other lubricating applications may allow contaminants or oil to degrade system components, or may insufficiently lubricate the bearings and thereby damage components.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Embodiments described herein are directed to electric motors and methods of manufacturing the same.

Hereinafter, embodiments will be described with reference to the drawings. Each drawing is a schematic view for describing an embodiment of the present disclosure and promoting the understanding thereof. The drawings should not be seen as limiting the scope of the disclosure. In each drawing, although there are parts differing in shape, dimension, ratio, and so on from those of an actual apparatus, these parts may be suitably changed in design taking the following descriptions and well-known techniques into account.

Figure 1:
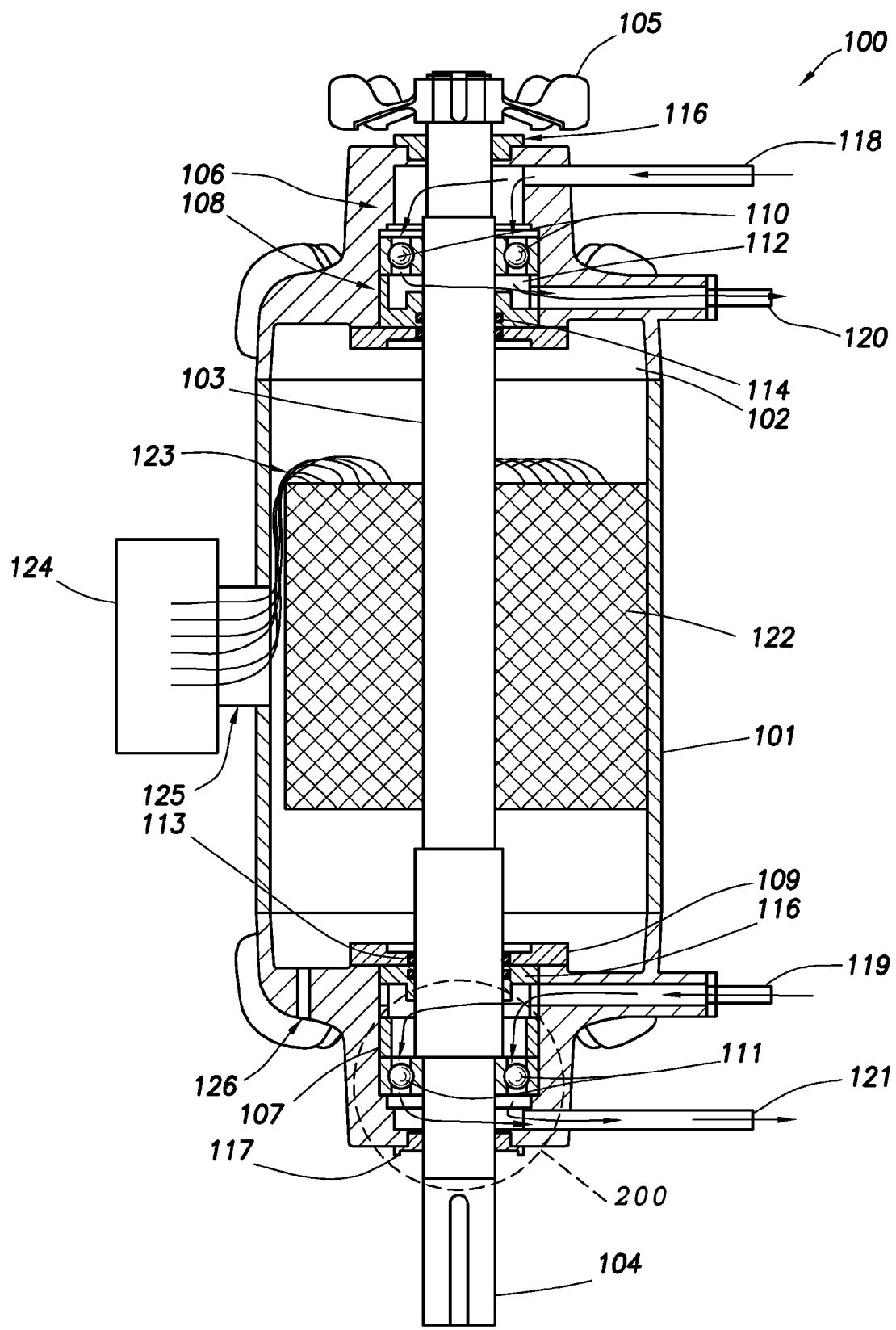
FIG. 1 shows an example electric motor incorporating aspects of the present disclosure.

FIG. 1 illustrates an example electric motor 100 incorporating aspects of the present disclosure. As can be seen, the electric motor 100 includes a case 101. The case 101 defines a motor compartment 102 and bearing compartments 106 and 107. A shaft 103 spans substantially the length of the case 101, within the motor compartment 102 and bearing compartments 106 and 107. The shaft is coupled to a fan 105 at an upper end of the electric motor 100 and a drive mechanism 104 at a bottom end of the electric motor 100. The drive mechanism 104 may be coupled to a load during normal motor operation.

Bearing caps 108 and 109 may separate and seal the motor compartment 102 from the bearing compartments 106 and 107. As will be described below, the bearing compartments 106 and 107 may be subjected to a fine oil mist as part of a lubrication process, and preventing the oil mist from entering the motor compartment 102 can save motor components from unnecessary exposure to the oil mist. The bearing caps 108 and 109 may comprise annular rings with an inner diameter and differing outer diameters. In certain embodiments, the bearing caps may be made out of machined metal with grooves machined on an inner annular surface. The inner annular surface may have a diameter effectively the same as shaft 103, in order to seal around the shaft, as will be discussed below. In certain embodiments, the bearing caps 108 and 109 may be partially disposed within a bearing compartment, such as compartments 106 and 107, and partially disposed within a motor compartment, such as compartment 102, and the outer diameter of the bearing caps 108 and 109 may reflect such placement. Additionally, the bearing caps 108 and 109 may be coupled to the case by way of a bolt, a weld, or any other attachment mechanism well known in the art.

As stated above, the diameter of the inner annular surfaces of bearing caps 108 and 109 may be substantially the same as the diameter of shaft 103, and the shaft 103 may pass through the inner annular space of both the bearing caps 108 and 109. Each of the bearing caps 108 and 109 may also include seals 114 and 113, respectively, that are disposed in grooves on the inner annular surfaces of bearing caps 108 and 109 and that sealingly engage with the shaft 103. In certain embodiments, the seals 114 and 113 may be felt seals. Felt seals may limit oil from moving between the bearing compartments 106 and 107 and the motor compartment 102, but may not prevent it completely. In certain embodiments, it may be necessary to completely seal the bearing compartments 106 and 107 from the motor compartment 102, and other seal types, such as seals 116 and 117, for example, may be used instead of felt seals. The shaft 103 may spin as part of normal motor operation, and the bearing caps 108 and 109 and seals 113 and 114 function to effectively seal the bearing compartments 106 and 107 from the engine compartment 102. This can be advantageous in an oil mist application to prevent the leakage of oil mist.

In addition to the seals 114 and 113, seals 116 and 117 may seal the bearing chambers 106 and 107, respectively, from the outside environment. The seals 116 and 117 may be generally annular and seal around the shaft 103 at the upper and lower ends of the case 102. In certain embodiments, the seals 116 and 117 may comprise seals, with internal labyrinth structures. Other seal types are possible, as would be appreciated by one of ordinary skill in view of this disclosure. Seals 116 and 117, and bearing caps 108 and 109, function to create generally segregated and sealed bearing chambers 106 and 107 on both ends of the motor chamber 102. Although the present embodiment includes two bearing chambers, in certain embodiments, there may only be one bearing chamber. Likewise, the sealing mechanisms may differ, as this disclosure is not limited to bearing caps 108 and 109 and seals 113, 114, 116, and 117.

In accordance with aspects of the present disclosure, motor 100 includes oil mist inlets 118 and 119 and oil mist outlets 120 and 121 in fluid communication with bearing chambers 106 and 107, respectively. As can be seen, oil mist may enter bearing chambers 106 and 107 through oil mist inlets 118 and 119, respectively. Once inside the bearing chambers, the oil mist may lubricate bearing mechanisms, such as bearings 110 and 111. The bearing mechanisms 110 and 111 may be coupled to both the case 101 and the shaft 103, holding the shaft 103 in position laterally and allowing the shaft to rotate freely within the case 101 using the bearings, as will be appreciated by one of ordinary skill in view of this disclosure.

As can be seen the bearing mechanisms 110 and 111 may each have a first side and a second side. The first side of bearing mechanisms 110 and 111 may be facing upwards, whereas the second side of the bearing mechanisms 110 and 111 may be facing downwards, opposite the first side. Advantageously, the oil mist inlets 118 and 119 are positioned adjacent to a first side of the bearings 110 and 111, respectively. The oil mist may lubricate the bearings as it passes through the bearings, collecting on a second side of the bearings, opposite the first side. The oil mist outlets 120 and 121 may be positioned adjacent to the second side of the bearings 110 and 111, respectively, ensuring a closed loop oil mist system whereby the oil mist passes through bearings 110 and 111. Notably, placing the inlets and outlets on opposite sides of a bearing in a vertical motor allows gravity to pull the oil mist through the bearings. Other configurations where the inlets and outlets are positioned on the same side of the bearing do not provide the same lubrication/closed loop system. Additionally, the placement of the inlet and outlets relative to the bearing chambers, coupled with the bearing caps 108 and 109 and seals 113, 114, 116, and 117, provide for a sealed, closed loop vertical oil mist system that reduces the chance that external contaminants can damage the bearings 110 and 111, and that oil from the oil mist system may escape, creating environmental concerns.

Although the motor shown in FIG. 1 illustrates an example motor in a vertical position, similar oil mist inlet and outlet configurations may be used when an electric motor is in other positions. In one example unillustrated embodiment, the motor may be in a horizontal position, with the shaft extending laterally through the case. In such configurations, the oil mist inlet and outlet may be positioned on opposite sides of a bearing mechanism as seen in FIG. 1, but the oil mist inlet may be positioned such that it is on the top side of the horizontal case, opposite the oil mist outlet on the bottom side of the horizontal case.

Figure 2:
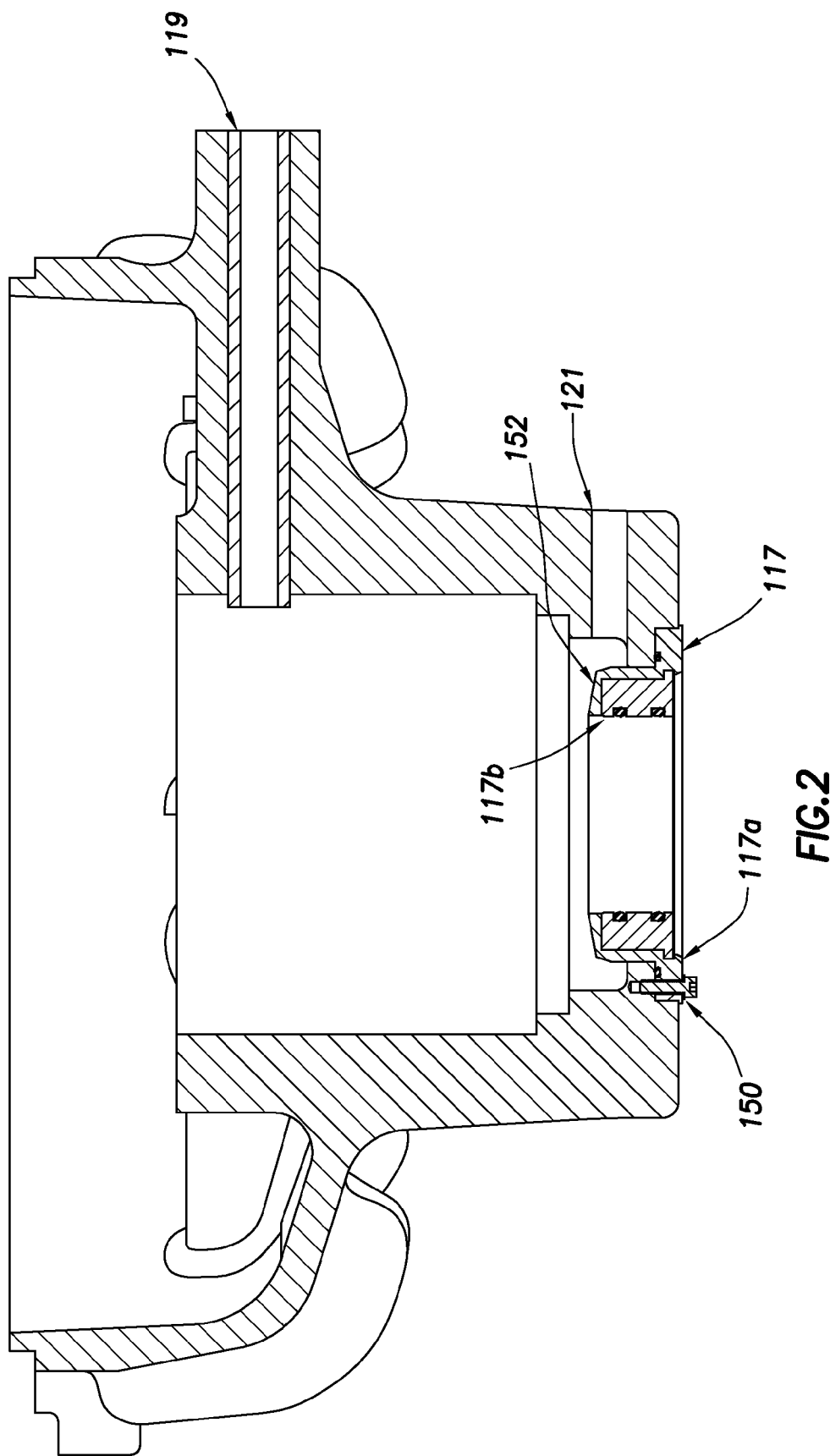
FIG. 2 shows an example vertical oil mist configuration of the example electric motor shown in FIG. 1.

FIG. 2 illustrates a close up view of section 200 from FIG. 1, with the shaft 103, bearing mechanism 111, and bearing cap 109 removed. As can be seen, inlet 119 and outlet 121 may comprise ports through case 101 which provide fluid communication with the bearing chamber 107. In certain embodiments, the motor may comprise a two-part seal, similar to the seal 117 shown in FIG. 2. In particular, the seal 117 comprises a fixed section 117a that is attached via bolt 150 to the case. In certain embodiments, the bolts may not be required to affix the seal to the case. In addition to the fixed section 117a, the seal 117 may also comprise an inner section 117b with o-rings to sealingly engage the shaft 103. The inner section may rotate with the shaft 103 in operation. Advantageously, the inner section may rotate within the fixed, outer section while the motor is operation, providing a seal between the bearing chamber 107 and the exterior environments, even when the shaft 103 is spinning. Additionally, as can be seen, the seal 117 is shown with a tapered top face 152. During oil mist applications, oil mist may accumulate on the top face 152 of the seal 117. The tapered face 152 ensures that the oil drains off of the seal 117 to be received at oil mist outlet 121.

Returning to FIG. 1, the motor compartment 102 may house the electric motor, comprising a rotor with magnets and coils of wire 122. As is appreciated by one of ordinary skill in the art, torque and rotation are imparted to the shaft by passing current through the coils of wire 122. According to the present disclosure, the current is passed through the coils via leads 123, which may be connected to an external power source in junction box 124. In certain embodiments, the leads 123 may comprise a non-wicking, oil-resistant insulative coating, such as cross-linked polyethylene (XLPE). XLPE cables are advantageous in an oil mist application because of the chance that oil mist may penetrate seal 114 and 113, entering the motor compartment 102. Without the non-wicking XLPE coating, the leads would be susceptible to short from prolonged exposure to oil.

Figure 3:
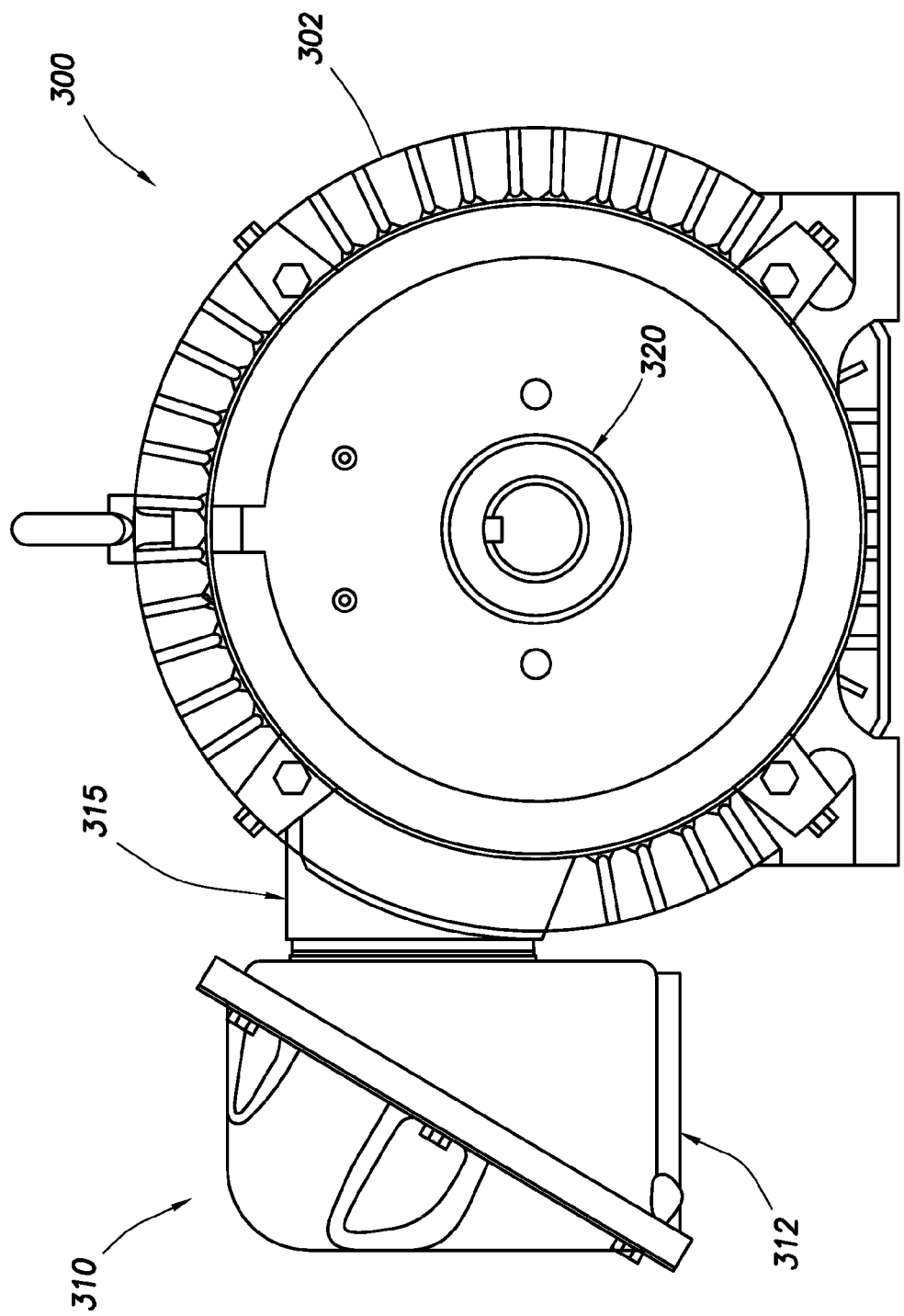
FIG. 3 shows an example electric motor incorporating aspects of the present disclosure.

As previously mentioned, leads 123 may be connected to an external power source within junction box 124. Junction box 124 may be coupled to the case 101. The leads 123 may be passed into the junction box 124 through a port 125 in case 101. The junction box 124 may further include a smaller transfer section between the junction box 124 and the case 101, which is attached to the case 101. An external view of an example motor 300 with a junction box 310 may be found in FIG. 3. FIG. 3 illustrates an example external view of motor 300. As can be seen, the motor 300 includes a case 302 and a shaft 320. Junction box 310 with a transfer section attached at a port 315 to the case 302 using a suitable attachment, such as a weld. Importantly, the connection between the junction box 310 and the case 302 may not allow environmental contaminants into the motor 300, or oil mist out of the motor into the environment.

An external power source may be connected to the motor 300 within junction box 310 using conduit knockouts 312, disposed at the bottom of the junction box 310. In particular, the conduit knockouts may be removed, the external power source leads fed into the junction box 310, and the external power source leads connected to the leads of the coils inside the motor, as shown in FIG. 1. Notably, the port through which the motor leads pass into junction box creates a path through which moisture, dirt, and other external contaminants may enter the motor cavity, threatening to degrade the coils. In certain embodiments, once the motor leads are fed into the junction box, the port 315 and transfer section of the junction box 310 may be filled with a hard set sealing compound. Advantageously, the hard set sealing compound may form a seal around the motor leads at the port, preventing oil from entering the junction box 310 and environmental contaminants from entering the motor 300.

As previously mentioned, the motor compartment of a motor utilizing a vertical oil mist configuration according to aspects of the present invention may be exposed to some oil mist due to incomplete seals. Returning to FIG. 1, seals 114 and 113 may allow some oil mist to pass into the motor compartment 102, exposing coils 122 and leads 123 to oil mist. In certain embodiments, a varnish may be applied to the coils and leads, preventing oil from being exposed to the coils themselves. Additionally, the case 101 may have a case drain 126 providing fluid communication between the motor compartment 102 and the external environments. If oil mist does enter the motor compartment 102, the oil mist will accumulate at the bottom of the motor compartment 102, near the case drain 126. A removable plug may be inserted into the case drain for normal operations and periodically removed to drain oil mist from the motor compartment 102. In certain embodiments, oil may be collected from the motor compartment may be fed back into the oil mist system via a return line coupled to the case drain.

As will be appreciated by one of ordinary skill in the art in view of this disclosure, the example motors with vertical oil mist applications are advantageous because they offer an optimized lubrication path for oil misting and are sealed to the external environments. Electric motors with greased bearings offer a robust configuration, in that they are generally tolerant to external contaminants such as dirt, but they require maintenance and manual grease changes, which can be difficult to accommodate in remote applications. An electric motor incorporating a vertical mist application according to aspects of the present invention, however, affords the opportunity to remotely manage the lubrication of the motor. As the oil mist pathway is susceptible to environmental contaminants, atmospherically sealing the motor using, for example, seals 113, 114, 116, 117, and hard set sealing compound material, dramatically decreases the chances that dirt or other degrading elements can enter the motor.

Figure 4:
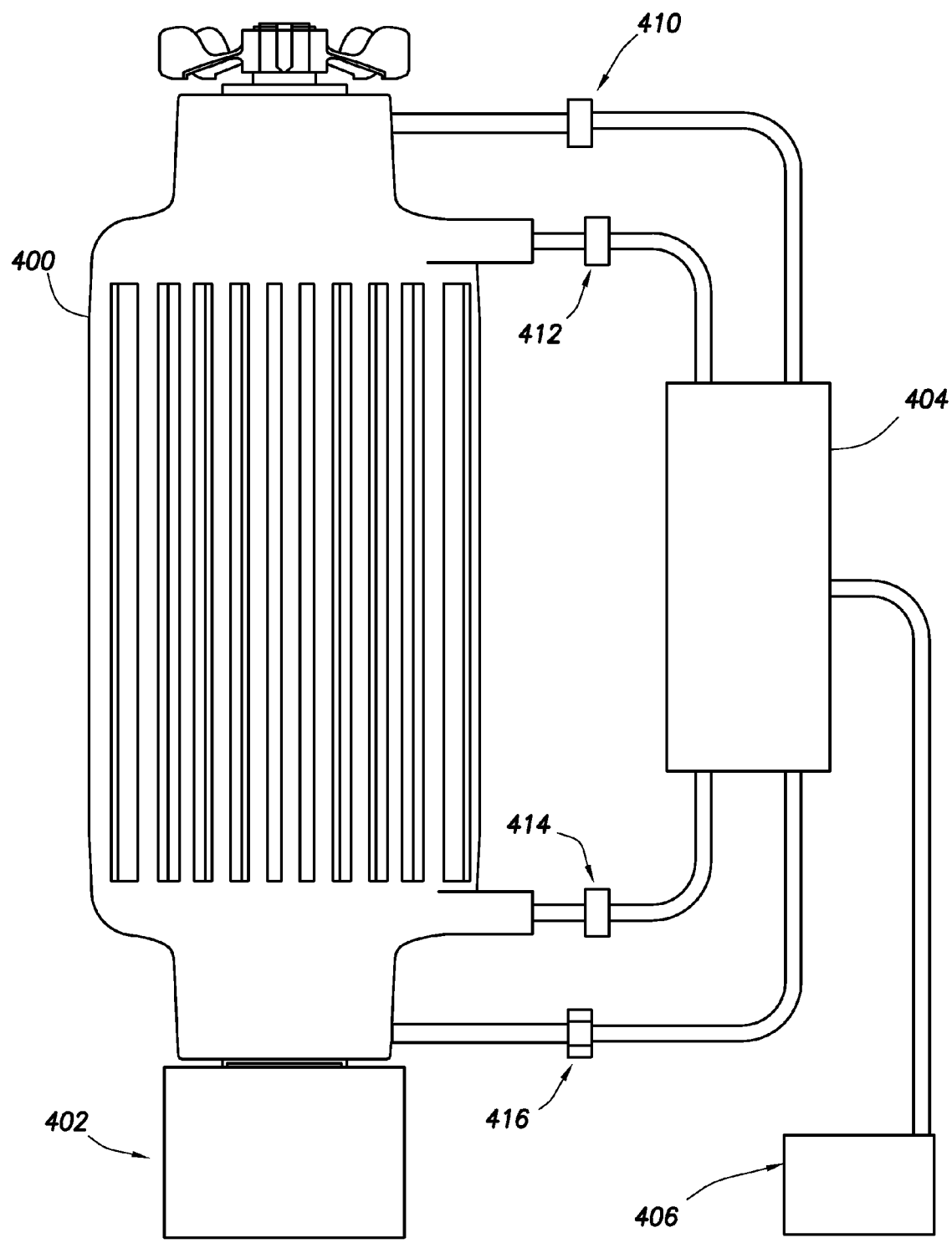
FIG. 4 shows an example oil mist system, according to aspects of the present invention.

FIG. 4 illustrates an example oil mist system incorporating a motor 400 with a vertical oil mist application according to aspects of the present disclosure. Notably, the configuration illustrated in FIG. 4 can be used locally or remotely, where the oil mist and lubrication of the motor 400 can be managed without traveling to the motor 400 to change the grease. In FIG. 4, motor 400 is coupled to a load 402. The load 402 may be coupled to a drive mechanism, such as drive mechanism 104 from FIG. 1. The motor 400 may further include oil mist inlets 410 and 414 and oil mist outlets 412 and 416. In certain embodiments, the inlets and outlets may be in fluid communication with bearing compartments within motor 400. Bearing compartments within the motor may include bearing mechanisms (not shown) with first sides and second sides, similar to bearing mechanisms 110 and 111 from FIG. 1. The inlets 410 and 414 and outlets 412 and 416 may be coupled to oil mist system 404 via pipes or hoses. The oil mist system 404 may generate oil mist from an internal reservoir, pumping the mist into the motor 400 via inlets 410 and 414 to a first side of an internal bearing mechanism, thereby lubricating internal bearings of the motor 400. The oil mist system may likewise pump the oil mist back into the system via outlets 412 and 416 from a second side of an internal bearing mechanism, where the oil mist system 404 condenses the oil and returns the oil to the oil reservoir. In certain embodiments, the oil mist system may utilize a compressed air source 406 to pump and circulate the oil mist. The compressed air source may be dedicated to one or a few oil mist systems or, in larger applications, the compressed air source may comprise a larger compressed air source that feeds many dozens of oil mist systems and other pneumatic systems.

While certain embodiments of a motor with a vertical oil mist configuration have been described, these embodiments have been presented by way of example only, and are not intended to limit the scope of the disclosure. Indeed, the novel systems described herein may be embodied in a variety of other forms; furthermore, various omissions, substitutions and changes in the form of the systems described herein may be made without departing from the spirit of the disclosure. The accompanying claims and their equivalent are intended to cover such forms or modifications as would fall within the scope and spirit of the disclosure.

What is claimed is:

1. An electric motor comprising:
a case, wherein the case defines a motor chamber and a bearing chamber;
a shaft at least partially disposed within the case, wherein the shaft spans the motor chamber and the bearing chamber;
a bearing mechanism disposed within the bearing chamber, wherein the bearing mechanism is coaxial with the shaft and comprises a plurality of bearings;
a bearing cap that at least partially separates and seals the motor chamber from the bearing chamber;
a seal at least partially disposed within the bearing chamber on an opposite side of the bearing chamber from the bearing cap, wherein the second seal includes a fixed portion attached to the case, and a rotating portion comprising a tapered face;
an oil mist inlet, wherein the oil mist inlet is adjacent to a first side of the bearing mechanism and in fluid communication with the bearing mechanism; and
an oil mist outlet, wherein the oil mist outlet is adjacent to a second side of the bearing mechanism and in fluid communication with the oil mist inlet through the plurality of bearings, wherein the second side is opposite the first side.

2. The electric motor of claim 1, wherein the bearing cap comprises an other seal that engages with the shaft.

3. The electric motor of claim 2, wherein the seal comprises two felt seals.

4. The electric motor of claim 2, further including a coil of wire within the motor chamber, wherein the coil of wire is attached to a non-wicking lead.

5. The electric motor of claim 4, further comprising a junction box attached to the case, wherein the junction box receives the non-wicking lead through a port in the case, and wherein the port is sealed with a hard-set mixture.

6. The electric motor of claim 2, further comprising a case drain, wherein the case drain provides fluid communication with the motor chamber through the case.

7. An electric motor comprising:
a case, wherein the case defines a motor chamber and a bearing chamber;
a shaft extending laterally through the motor chamber and the bearing chamber;
a bearing cap coaxial with the shaft, wherein the bearing cap at least partially separates and seals the motor chamber from the bearing chamber, and wherein the bearing cap sealingly engages the shaft;
a seal at least partially disposed within the bearing chamber on an opposite side of the bearing chamber from the bearing cap, wherein the second seal includes a fixed portion attached to the case, and a rotating portion comprising a tapered face;
a bearing mechanism positioned within the bearing chamber, wherein the bearing mechanism is coaxial with the shaft and comprises a plurality of bearings;
an oil mist inlet, wherein the oil mist inlet is adjacent to a first side of the bearing mechanism, wherein the oil mist inlet provides fluid communication with the bearing chamber through the case;
an oil mist outlet, wherein
the oil mist outlet is adjacent to a second side of the bearing mechanism,
the second side is opposite the first side,
the oil mist outlet provides fluid communication with the bearing chamber through the case, and
the oil mist outlet is in fluid communication with the oil mist inlet through the plurality of bearings; and
a case drain, wherein the case drain provides fluid communication with the motor chamber through the case.

8. The electric motor of claim 7, further comprising a coil of wire coaxial with the shaft within the motor chamber, wherein the coil of wire is attached to a lead, wherein the lead comprises an cross-linked polyethylene ("XLPE") lead.

9. The electric motor of claim 8, further comprising a junction box attached to the case, wherein the junction box receives the lead through a port in the case, and wherein the port is sealed with a hard-set mixture.

10. The electric motor of claim 8, wherein the coil of wire is coated with an oil-resistant varnish.

11. The electric motor of claim 7, wherein the bearing cap sealingly engages with shaft with two felt seals disposed within grooves on an inner annular surface of the bearing cap.

12. A method for using an electric motor with a vertical oil mist configuration, comprising:
    positioning the electric motor such that a shaft at least partially disposed within the electric motor is in a substantially vertical position;
    pumping oil mist into an oil mist inlet of the electric motor, wherein
        the oil mist inlet is adjacent to a first side of a bearing mechanism within a bearing chamber of the electric motor,
        the bearing mechanism comprises a plurality of bearings;
        a bearing cap that at least partially separates and seals the bearing chamber from a motor chamber of the electric motor;
        a seal is at least partially disposed within the bearing chamber on the opposite side of the bearing chamber from the bearing cap, and the second seal includes a fixed portion attached to a case of the electric motor, and a rotating portion comprising a tapered face; and
        the oil mist inlet is in fluid communication with the plurality of bearings; and
    pumping oil mist from an oil mist outlet of the electric motor, wherein the oil mist outlet is adjacent to a second side of the bearing mechanism within the electric motor, wherein the second side is opposite the first side, and wherein the oil mist outlet is in fluid communication with the oil mist inlet through the plurality of bearings.

13. The method of claim 12, wherein the oil mist pathway is substantially sealed.

\* \* \* \* \*